UNITED STATES PATENT OFFICE.

FLETCHER B. HOLMES, OF WOODBURY, NEW JERSEY, ASSIGNOR TO THE E. I. DU PONT DE NEMOURS POWDER COMPANY, OF WILMINGTON, DELAWARE, A CORPORATION OF NEW JERSEY.

STABILIZED NITRATED STARCH.

No. 875,923.     Specification of Letters Patent.     Patented Jan. 7, 1908.

Application filed May 20, 1907. Serial No. 374,531.

*To all whom it may concern:*

Be it known that I, FLETCHER B. HOLMES, a citizen of the United States, residing at Woodbury, county of Gloucester and State of New Jersey, have invented a new and useful Improvement in Stabilized Nitrated Starch, of which the following is a full, clear, and exact description.

The object of my invention is to produce stable nitrated starch.

Nitrated starch may be used as an explosive itself, or preferably may be used as a component part of an explosive, such as where it is mixed with sodium nitrate, potassium nitrate, or some other oxygen carrier, with or without the addition of other ingredients. The difficulty with nitrated starch is that it is very unstable, being liable to decomposition. When such nitrated starch decomposes, which it is liable to do at ordinary temperatures, it becomes liable to spontaneous combustion.

I have discovered that I can produce a stable nitrated starch by mixing with nitrated starch a salt of anilin, such as anilin oxalate $(C_6H_5NH_2)_2H_2C_2O_4$, which is the salt of anilin I prefer to use. Anilin hydrochlorid, anilin nitrate, anilin sulfate, etc. may also be used.

In practice the reagent is mixed with the nitrated starch, prepared in the ordinary and well known manner. The mixing may be made in any manner to produce a good mixture. They may be mixed wet or dry and in any kind of a mixer. Preferably I mix the two, in a finely divided powdered condition, in a bowl provided with stirrers or paddles, and in an amount preferably from two to five per cent., although larger and smaller amounts can be used with success. I have found three per cent. to give good results.

Having now fully described my invention, what I claim and desire to protect by Letters Patent is:

1. A stable explosive consisting of a mixture of nitrated starch and a salt of anilin, the latter being in such proportion as to stabilize the nitrated starch.

2. A stable explosive, consisting of a mixture of nitrated starch, and from two to five per cent. of a salt of anilin.

3. A stable explosive consisting of a mixture of nitrated starch and anilin oxalate, the latter being in such proportions as to stabilize the nitrated starch.

4. A stable explosive consisting of a mixture of nitrated starch and from two to five per cent. of anilin oxalate.

In testimony of which invention, I have hereunto set my hand, at Philadelphia, on this 15th day of May, 1907.

FLETCHER B. HOLMES.

Witnesses:
M. M. HAMILTON,
E. E. WALL.